United States Patent [19]

Sata

[11] Patent Number: 5,013,946
[45] Date of Patent: May 7, 1991

[54] MINIATURE MOTOR WITH A FREQUENCY GENERATOR

[75] Inventor: Nobuyuki Sata, Matsudo, Japan

[73] Assignee: Mabuchi Motor Co., Ltd., Matsudo, Japan

[21] Appl. No.: 343,790

[22] Filed: Apr. 26, 1989

[30] Foreign Application Priority Data

May 11, 1988 [JP] Japan .............................. 63-61897[U]

[51] Int. Cl.$^5$ ...................... H02K 19/24; H02K 11/00; H02K 27/28; G01P 3/48
[52] U.S. Cl. .............................. 310/40 MM; 310/113; 310/68 R; 310/171; 324/173
[58] Field of Search ............... 310/40 MM, 48, 68 B, 310/68 R, 111, 113, 168, 169, 170, 171; 363/170, 175; 324/173, 174, 166

[56] References Cited

U.S. PATENT DOCUMENTS

| | | | |
|---|---|---|---|
| 3,739,211 | 6/1973 | Hasler | 324/174 |
| 3,967,200 | 6/1976 | Tetsugu et al. | 324/173 |
| 4,237,394 | 12/1980 | Aoki | 310/113 |
| 4,259,603 | 3/1981 | Uchiyama et al. | 324/174 |
| 4,385,249 | 5/1983 | Fukushima | 310/68 R |
| 4,501,983 | 2/1985 | Schmider | 310/113 |
| 4,829,254 | 5/1989 | Baines | 324/173 |

Primary Examiner—Steven L. Stephan
Assistant Examiner—C. LaBalle
Attorney, Agent, or Firm—McGlew and Tuttle

[57] ABSTRACT

A miniature motor with a frequency generator comprising a motor portion having a stator with a permanent magnet for forming a magnetic field and a rotor with rotor windings wound on a rotor core; electric current being fed to the rotor windings via a commutator making sliding contact with brushes, and a frequency generator for detecting the revolution of the motor, in which the frequency generator comprises a frequency generator rotor, mounted on the motor rotor, having a disc-like rotor portion made of a soft magnetic material and equipped with a plurality of magnetic-pole teeth on the outer periphery thereof, an internal-gear core of an annular disc shape, made of a soft magnetic material, disposed in such a manner as to come in contact with the inside of a motor housing and face the outer circumferential surface of the rotor portion and equipped with a plurality of magnetic-pole teeth on the inner periphery thereof, a permanent magnet forming a magnetic field between the magnetic-pole teeth of the rotor portion and the magnetic-pole teeth of the inner-gear core, and a frequency generator stator having frequency-detecting coils which detect changes in magnetic flux in a magnetic circuit in which the magnetic fluxes caused by the permanent magnet pass, and generate an induced voltage proportional to the revolution of the rotor portion.

6 Claims, 5 Drawing Sheets

MINIATURE MOTOR WITH A FREQUENCY GENERATOR

BACKGROUND OF THE INVENTION

This invention relates generally to a miniature motor with a frequency generator, for example, that for use for driving small tape recorders, and more particularly to a miniature motor with a frequency generator having good frequency characteristics and a high output, in which the size of the motor is prevented from being increased by making effective use of a space for accommodating the frequency generator.

DESCRIPTION OF THE PRIOR ART

Heretofore, a miniature motor incorporating a frequency generator comprising a rotor having a plurality of magnetic-pole teeth, a stator having a plurality of magnetic-pole teeth provided in such a manner to face the magnetic-pole teeth of the rotor, a permanent magnet forming a magnetic field between the magnetic-pole teeth of the rotor and the magnetic-pole teeth of the stator, and frequency-detecting coils generating an induced voltage proportional to the revolution of the rotor in accordance with changes in the magnetic field between the magnetic-pole teeth of the rotor and the stator is publicly known. FIGS. 7A and 7B are diagrams illustrating the construction of a miniature motor of a conventional type without the frequency generator, FIG. 8A is a diagram illustrating the construction of a prior-art miniature motor incorporating the frequency generator, and FIG. 8B is a perspective view illustrating the frequency generator in the prior art shown in FIG. 8A.

FIG. 7B is a diagram of assistance in explaining the state where the brush is held, viewed in the direction A—A shown in FIG. 7A. In FIG. 7A, the construction for holding brushes is omitted. The same applies to FIG. 8A.

The miniature motor shown in FIG. 7 comprises brush-gear 3 held by brush retainers 2 mounted on an end bell plate 1 and formed with a synthetic resin, a commutator 7 fixedly fitted to a motor shaft 6 supported by bearings 5, a rotor 8 fixedly fitted to the motor shaft 6 via the commutator 7, a rotor winding 8-2 wound on a rotor core 8-1 of the rotor 8, and a permanent magnet 10 fixedly fitted to the inner circumferential surface of a motor housing 9. When electric current is fed to the rotor winding 8-2 of the miniature motor, the rotor 8 lying in a magnetic field formed by the permanent magnet 10 and the motor housing 9 is caused to revolve. Numeral 11 in the figure refers to a noise-suppressing element.

The prior-art miniature motor incorporating a frequency generator 12 for detecting the revolution of the motor, as shown in FIG. 8 is obtained by extending the motor shaft 6 of the miniature motor shown in FIG. 7 in the axial direction, and extending the axial length of the motor housing 9. The frequency generator 12 is housed in a space provided as the result of these extensions. Numeral 12-1 in the figure indicates a rotor of the frequency generator (hereinafter referred to as the FG rotor), having multi-pole magnetizing magnets on the outer periphery thereof. Numeral 12-2 indicates a stator of the frequency generator (hereinafter referred to as the FG stator), having a comb-shaped core 12-21 disposed opposite to the outer periphery of the FG rotor 12-1 and a detecting coil 12-22 wound on the comb-shaped core 12-21.

Other numerals correspond to those shown in FIG. 7.

In FIG. 8A, as the motor is driven, the FG rotor 12-1 is also caused to revolve.

With the revolution of the FG rotor 12-1, the polarities of the magnetic poles of the FG rotor 12-1 facing the comb teeth of the FG stator 12-2 are virtually repeatedly reversed. This causes the direction of magnetic fluxes linking the detecting coil 12-22 to change as the polarities of the magnetic poles of the FG rotor are virtually reversed. This in turn causes induced voltage to generate in the detecting coil 12-22. Since the induced voltage has a frequency proportional to the revolution of the FG rotor 12-1, the revolution of the motor can be detected by measuring the frequency of the induced voltage.

As described above, the prior-art miniature motor requiring a space specially provided for accommodating the frequency generator 12 tends to be of larger sizes, particularly in the axial direction of the motor.

SUMMARY OF THE INVENTION

This invention is intended to overcome these problems. To this end, the miniature motor with a frequency generator of this invention comprises a stator having a permanent magnet for forming a magnetic field, a rotor having a rotor winding wound on a rotor core, and a motor portion in which electric current is fed to the rotor winding via a commutator making sliding contact with brushes; the frequency generator comprising a frequency generator rotor having a disc-shaped rotor portion, made of a soft magnetic material, mounted on the rotor and equipped with a plurality of magnetic-pole teeth on the outer periphery thereof, an internal-gear core of an annular disc shape, made of a soft magnetic material, disposed in such a manner as to come in contact with the inside of a motor housing and face the outer circumferential surface of the rotor portion and equipped with a plurality of magnetic-pole teeth on the inner periphery thereof, a permanent magnet for forming a magnetic field between the magnetic-pole teeth of the rotor portion and the magnetic-pole teeth of the internal gear core, and a frequency generator stator having frequency-detecting coils which detect changes in magnetic fluxes generated in a magnetic circuit in which magnetic fluxes caused by the permanent magnet pass and generate an induced voltage proportional to the revolution of the rotor portion.

These and other objects of the invention will become more apparent in the detailed description taken in connection with FIGS. 1 through 6.

DETAILED DESCRIPTION OF THE EMBODIMENT

Figure 1:
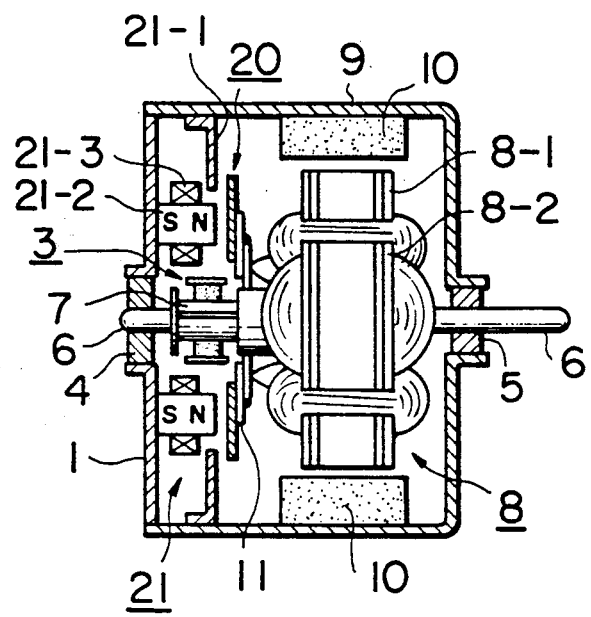
FIG. 1 is a structural diagram illustrating the principle of this invention.
Figure 2:
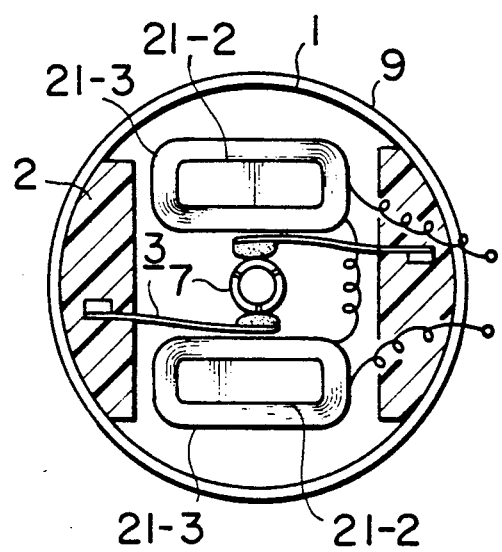
FIG. 2 is a diagram of assistance in explaining the state where the detecting coils are disposed in the miniature motor shown in FIG. 1.
Figure 7A:
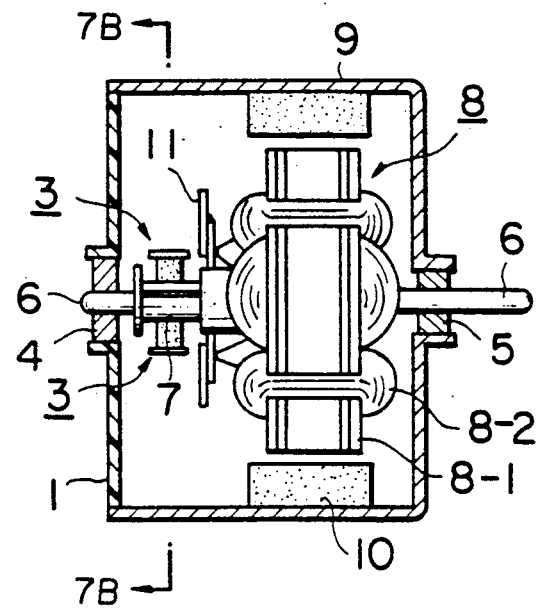
FIGS. 7A and 7B are structural diagrams illustrating a miniature motor of a conventional type without a frequency generator.
Figure 7B:
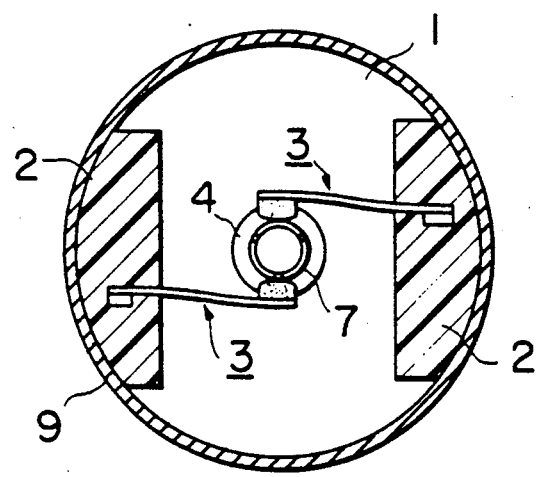
Figure 8A:
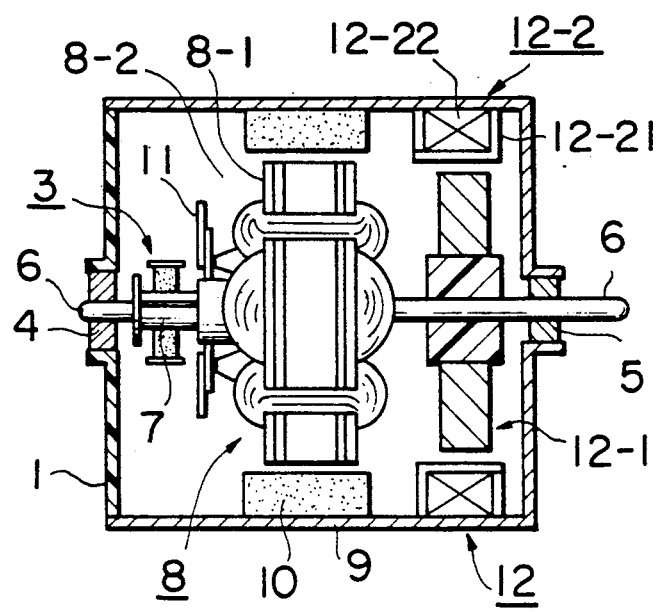
FIG. 8A is a structural diagram of assistance in explaining a prior-art miniature motor incorporating a frequency generator.
Figure 8B:
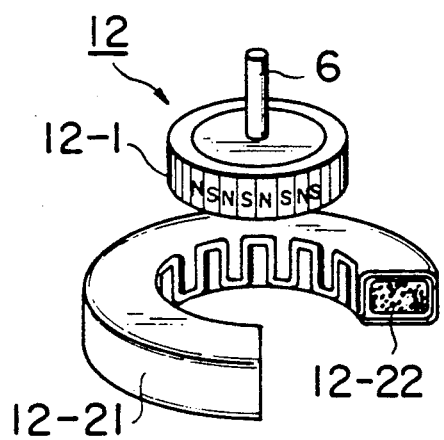
FIG. 8B is a perspective view illustrating the frequency generator used in the prior-art miniature motor shown in FIG. 8 (A).

FIGS. 1 and 2 illustrate a miniature motor incorporating a frequency generator embodying this invention. In FIGS. 1 and 2, numeral 20 refers to an FG rotor; 20-11 to a gear portion; 21 to an FG stator; 21-1 to an internal-gear core; 21-2 to an FG magnet; and 21-3 to a detecting coil, respectively. Other numerals correspond with those in FIG. 7.

This invention includes the provision of a space around the brushgear 3 and the commutator 7, which can be used for the frequency generator. That is, by installing a frequency generator in this space, a miniature motor with a frequency generator of essentially the same size as that of a miniature motor without a frequency generator can be obtained.

Figure 5A:
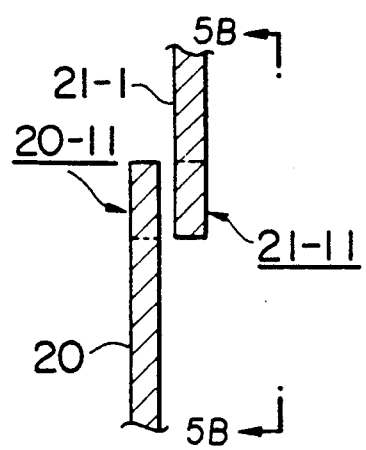
FIG. 5A being a partially enlarged view and FIG. 5B being a side elevation taken along line A—A in FIG. 5A.
Figure 5B:
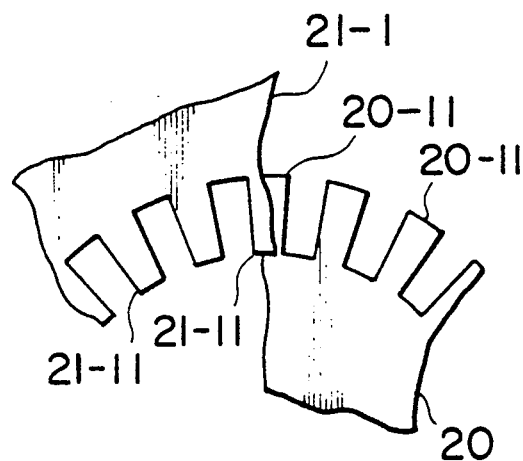
FIG. 5 is a diagram of assistance in explaining the FG rotor and stator in the embodiment shown in FIG. 3.

In FIGS. 1 and 2, the FG rotor 20 is made of a soft magnetic material of an annular disc shape and fixedly fitted to the insulating surface or the equipotential surface of a noise-suppressing element 11. The outer periphery of the FG rotor 20 is formed into a gear shape (FIG. 5B).

The FG stator 21 consists of the internal-gear core 21-1, the permanent magnet 21-2 and the detecting coil 21-3. The internal-gear core 21-1 is made of a soft magnetic material and of an essentially annular disc shape, and has a gear (FIG. 5B) formed on the inner periphery thereof with the same pitch as that of the gear formed on the outer periphery of the FG rotor 20. A pair of the permanent magnets 21-2 (hereinafter referred to as the FG magnet) are provided on the inside surface of the end bell plate 1. The detecting coil 21-3 is wound on each of the FG magnets 21-2. The internal-gear core 21-1 of the FG stator 21 is fixedly fitted to the motor housing 9 in such a manner that the internal-gear portion of the internal-gear core 21-1 faces the gear portion of the FG rotor 20 via a predetermined gap.

As shown in FIG. 2, a pair of the detecting coils 21-3 are connected in series.

The frequency generator shown in FIG. 1 consists of the FG rotor 20 and the FG stator 21, and a magnetic circuit is formed in the frequency generator by a path of FG magnet 21-2 — FG rotor 20 — internal-gear core 21-1 — motor housing 9 — end bell plate 1 — FG magnet 21-2. As the motor is driven, the FG rotor 20 is also caused to revolve. With the revolution of the FG rotor 20, magnetic flux density changes in accordance with the change in magnetic resistance in the gap between the FG rotor 20 and the internal-gear core 21-1 of the FG stator 21. As a result, an induced voltage having a frequency corresponding to the change in magnetic flux density is generated in the detecting coil 21-3. Since the frequency of the induced voltage is proportional to the revolution of the FG rotor 20, the revolution of the motor can be detected by measuring the frequency of the induced voltage in the detecting coil 21-3.

Meanwhile, the presence of magnetic flux fluctuations due to noises in the magnetic circuit may adversely affect the output of the detecting coil 21-3.

The revolution of the motor, however, can be detected accurately because the magnetic flux fluctuations caused by noises can be offset by disposing a pair of the detecting coils 21-3 at symmetrical positions with respect to the commutator 7 shown in FIG. 1.

Figure 3:
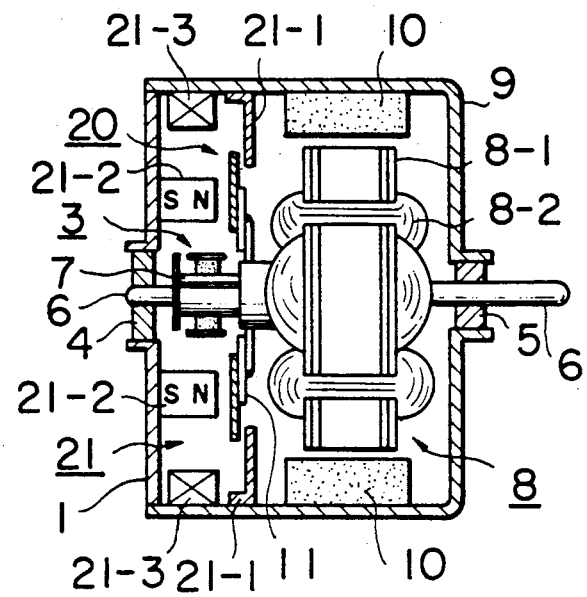
FIG. 3 is a structural diagram illustrating an embodiment of this invention.
Figure 4:
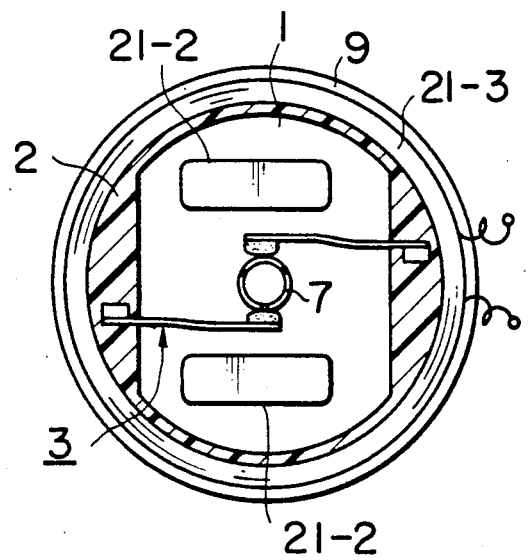
FIG. 4 is a diagram of assistance in explaining the state where the detecting coils are disposed in the embodiment shown in FIG. 3.

In the embodiment shown in FIG. 3, the internal-gear core 21-1 is disposed in such a manner that the FG rotor 20 lies between the internal-gear core 21-1 and the FG magnet 21-2. As shown in FIG. 4, the detecting coil is wound along the inner periphery of the motor housing 9. Consequently, the embodiment shown in FIG. 3 has essentially the same construction as that of the embodiment shown in FIG. 1.

In the embodiment shown in FIG. 3, as the FG rotor 20 is located between the internal-gear core 21-1 and the FG magnet 21-2, the sum of the distance between the FG magnet 21-2 and the FG rotor 20, and the distance between the FG rotor 20 and the internal-gear core 21-1 can be kept constant even if the motor shaft 6 is moved in the axial direction. Consequently, the changes in magnetic resistance in the gaps among the FG magnet 21-2, the FG rotor 20, the internal-gear core 21-1 resulting from the axial movement of the motor shaft 6 can be prevented.

The detecting coil 21-3 is wound along the inside surface of the motor housing 9, as shown in FIG. 4.

This is to reduce the unwanted effect of the magnetic fluxes from the rotor 8 caused by the revolution of the motor rotor 8. That is, most of the leaked magnetic fluxes from the side of the rotor 8 in the embodiment shown in FIGS. 3 and 4 flow through the internal-gear core 21-1, the motor housing 9, the end bell plate 1, the motor housing 9 and the internal-gear core 21-1 at the bottom of the figure. As a result, the leaked magnetic fluxes do not link the detecting coil 21-3 regardless of the revolving angle position of the rotor 8. Thus, the detecting coil 21-3 as a whole is free from the effect of the unwanted noise caused by the magnetic fluxes. In other words, the unwanted effect of noises caused by the magnetic fluxes from the the motor rotor 8 is eliminated. Furthermore, a coil bobbin can be eliminated because a groove for housing the detecting coils is formed on the outer periphery of the brush retainer 2 made of an electrically insulating material for holding the brushgear 3 along the inner circumferential surface of the motor housing 9. This helps reduce the manufacturing cost of miniature motors and facilitates wire winding operation, leading to labor saving.

In this invention, the internal-gear portion of the internal-gear core 21-1 and the gear portion of the FG rotor 20, both having the same pitch, are disposed at a position to face each other via a predetermined gap. That is, the internal-gear core 21-1 and the FG rotor 20 in the embodiment shown in FIG. 3 are of a flat disc shape, with the internal-gear portion 21-11 of the internal-gear core 21-1 and the gear portion 20-11 of the FG rotor 20 facing each other at the side surfaces thereof. It should be noted that the accuracy of the relative positions of the internal-gear portion 21-11 and the gear portion 20-11 has a great effect on the performance of the frequency generator.

Figure 6A:
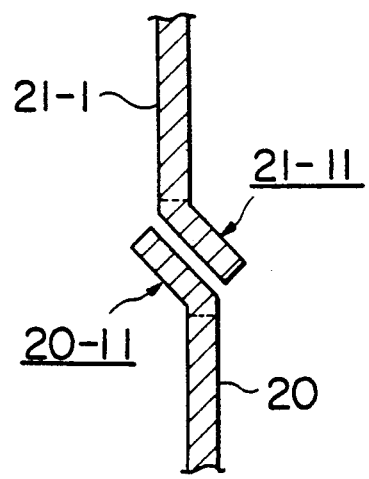
FIGS. 6A and 6B are diagrams of assistance in explaining another embodiment of the FG rotor and stator used in this invention.
Figure 6B:
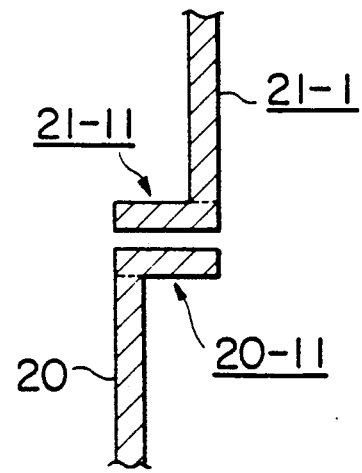

To increase the accuracy of the abovementioned relative positions, it is desirable to increase the positional accuracy both in the axial and radial directions of the internal-gear core 21-1 and the FG rotor 20. With this invention, however, it is possible to increase the accuracy of the relative positions of the internal-gear core 21-1 and the FG rotor 20 by selecting any of the arrangements shown in FIGS. 5, 6A and 6B. That is, if the accuracy in the radial direction is low, the embodiment shown in FIG. 5 is employed. If the accuracy in the axial direction is low, the embodiment shown in FIG. 6B is used. For intermediate cases, the embodiment shown in FIG. 6A may be used.

As described above, this invention makes it possible to obtain a miniature motor with a frequency generator having good frequency characteristics and a high output, in which the size of the motor is prevented from being increased by making effective use of a space available in the motor for accommodating the frequency generator.

Another advantage of this invention is that common parts can be used for both miniature motors with and without the frequency generator.

What is claimed is:

1. A miniature motor and frequency generator arrangement, comprising: a bell-shaped housing portion; an end plate portion connected to an open end of said bell-shaped housing; a first motor shaft bushing connected to said bell-shaped housing; a second motor shaft bushing connected to said end plate; a motor shaft supported by said first housing and said second bushing for rotation; a rotor core support on said rotor shaft; a stator including a permanent magnet connected to said bell-shaped housing; said stator being positioned radially outwardly of said rotor core; rotor windings wound on said rotor core to form a rotor; a commutator positioned on said rotor shaft within said bell-shaped housing; brushes supported in said bell-shaped housing extending to engage said commutator by making sliding contact with said commutator; a disk-shaped frequency generator rotor portion formed of soft magnetic material, said disk-shaped frequency generator rotor including magnetic-pole teeth on an outer periphery thereof; an annular disk internal-gear core, formed of a soft magnetic material, an outer periphery of said annular-disk internal-gear core being connected to and supported by said bell-shaped housing, said annular-disk internal gear core having an inner periphery defining a plurality of magnetic-pole teeth, said annular-disk internal gear core magnetic-pole teeth being positioned facing said disk-shaped frequency generator rotor magnetic-pole teeth, said annular-disk internal gear core magnetic-pole teeth being spaced away from said disc-shaped frequency generator rotor magnetic-pole teeth to define a gap; at least one frequency generator stator permanent magnet positioned adjacent said gap, said at least one frequency generator stator permanent magnet being connected to said end plate for defining a magnetic field between said disc-shaped frequency generator rotor and said annular-disc internal gear core magnetic-pole teeth; and, a frequency generator stator including frequency-detecting coils for detecting the changes in magnetic flux and generating an induced voltage proportional to the revolution of the rotor, said frequency generator is disposed in a space defined by said brushes and said motor housing.

2. A miniature motor and frequency generator arrangement as set forth in claim 1, wherein said disc-shaped frequency generator rotor is disposed between said annular disc internal-gear core and said frequency generator stator permanent magnet.

3. A miniature motor and frequency generator arrangement as set forth in claim 1, wherein said disc-shaped frequency generator rotor magnetic pole teeth are positioned parallel to an axial direction of said shaft.

4. A miniature motor and frequency generator arrangement as set forth in claim 1, wherein said disc-shaped frequency generator rotor magnetic pole teeth and said annular-disc internal-gear core magnetic pole teeth face each other at an angle of 45 degrees.

5. A miniature motor and frequency generator arrangement as set forth in claim 1, wherein said frequency generator stator frequency-detecting coils are wound on the outer periphery of said frequency generator stator permanent magnet.

6. A miniature motor and frequency generator arrangement as set forth in claim 1, wherein said frequency generator stator frequency detecting coils are disposed in a groove formed on an outer periphery of a brush retainer, said brush retainer for retaining brushes and being positioned along an inner circumferential surface of a bell-shaped housing portion.

* * * * *